(12) United States Patent
Lush

(10) Patent No.: US 7,506,611 B1
(45) Date of Patent: Mar. 24, 2009

(54) COLLAPSIBLE FEEDER

(76) Inventor: Raymon W. Lush, 410 Main St., Bloomfield, NE (US) 68718

( * ) Notice: Subject to any disclaimer, the term of this patent is extended or adjusted under 35 U.S.C. 154(b) by 240 days.

(21) Appl. No.: 11/515,585

(22) Filed: Sep. 5, 2006

(51) Int. Cl.
*A01K 5/00* (2006.01)
(52) U.S. Cl. .................................. 119/52.1; 119/52.2
(58) Field of Classification Search ............... 119/52.1, 119/52.2, 51.01, 61.3, 429, 431, 61.31, 461, 119/498, 499
See application file for complete search history.

(56) References Cited

U.S. PATENT DOCUMENTS

| | | | | | |
|---|---|---|---|---|---|
| 640,418 | A | * | 1/1900 | Royer | 206/218 |
| 1,093,873 | A | * | 4/1914 | Mitchell | 220/8 |
| 1,790,045 | A | * | 1/1931 | Harvey | 119/52.1 |
| 2,789,534 | A | * | 4/1957 | Landgraf | 119/52.1 |
| 3,285,459 | A | * | 11/1966 | Gahm | 220/8 |
| 3,961,444 | A | * | 6/1976 | Skaife | 47/79 |
| 4,204,500 | A | * | 5/1980 | Podjan | 119/57.8 |
| 4,528,774 | A | * | 7/1985 | Skaife | 47/81 |
| 4,940,019 | A | * | 7/1990 | Coffer | 119/52.2 |
| 4,978,021 | A | * | 12/1990 | Mini et al. | 220/8 |
| 5,425,203 | A | * | 6/1995 | Scott | 47/70 |
| 5,826,539 | A | * | 10/1998 | Bloedorn | 119/52.2 |
| 5,829,382 | A | * | 11/1998 | Garrison | 119/52.2 |
| 5,924,381 | A | * | 7/1999 | Bloedorn | 119/52.2 |
| 6,047,661 | A | * | 4/2000 | Lush | 119/51.01 |
| 6,073,582 | A | * | 6/2000 | Lush | 119/51.01 |
| 6,095,087 | A | * | 8/2000 | Bloedorn | 119/52.2 |
| 6,427,629 | B1 | | 8/2002 | Lush | 119/52.1 |
| 6,497,195 | B1 | * | 12/2002 | Beyers | 119/60 |
| 6,666,329 | B1 | * | 12/2003 | Charbonneau | 206/218 |
| 6,866,004 | B1 | | 3/2005 | Lush | 119/52.1 |
| 7,021,240 | B1 | * | 4/2006 | Tippetts | 119/52.1 |
| 7,032,538 | B1 | * | 4/2006 | Lush | 119/52.1 |
| 7,185,605 | B1 | * | 3/2007 | Lush | 119/52.2 |
| D544,303 | S | * | 6/2007 | Strepkoff | D7/512 |

FOREIGN PATENT DOCUMENTS

EP 0559167 A1 * 8/1993

* cited by examiner

*Primary Examiner*—Yvonne R. Abbott
(74) *Attorney, Agent, or Firm*—Dennis L. Thomte; Thomte Patent Law Office LLC

(57) ABSTRACT

A collapsible feeder for birds, squirrels and the like and comprises a feeder body including a base and a rim. A series of hollow body segments of graduated diameters extend upwardly from the base within the rim to form a feeder body. The segment of smallest diameter is joined to the base and has a plurality of feed outlet openings formed therein to enable feed from within the feeder body to pass outwardly therefrom onto the base inwardly of the rim. A feeder lid is provided at the upper end of the segment of greatest diameter when the feeder body is in the extended position. The body segments include structure for yieldably maintaining the feeder in its straight extended position for filling and hanging. At least some of the body segments are comprised of a perforated metal material to enable the visual observation of the feed level within the feeder.

10 Claims, 4 Drawing Sheets

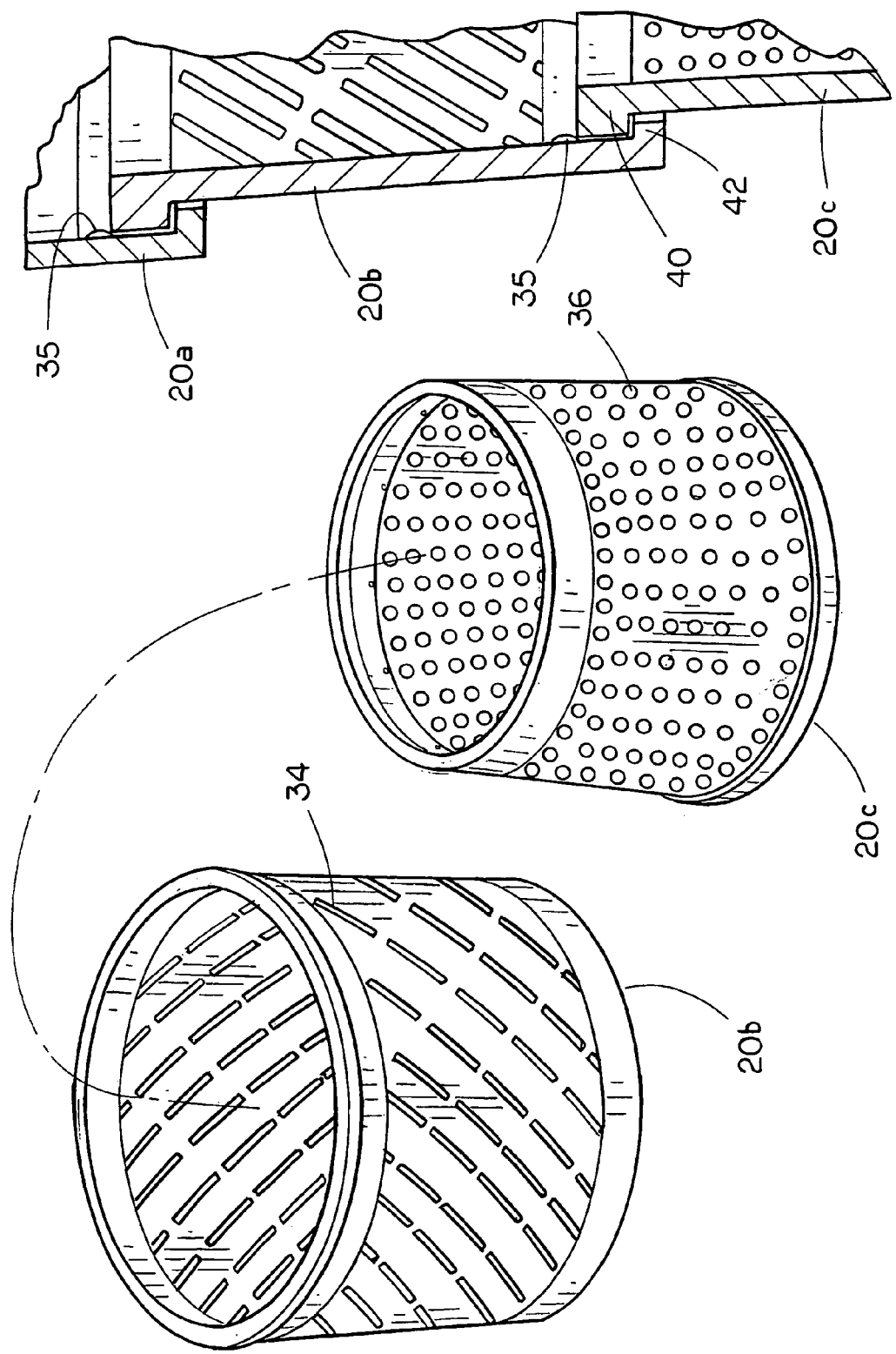

COLLAPSIBLE FEEDER

BACKGROUND OF THE INVENTION

1. Field of the Invention

This invention relates to a collapsible feeder and more particularly to a collapsible feeder for birds, squirrels and the like which is convenient to fill, convenient to install, convenient for wild game to perch upon, and which is resistant to damage from squirrels and other feeding wildlife. Even more particularly, the collapsible feeder of this invention includes means for yieldably maintaining the feeder in its extended position while the feeder is being filled and/or hung. Further, the feeder is comprised of a plurality of feeder segments, some of which are comprised of a perforated metal material.

2. Description of the Related Art

Selectively collapsible feeders are commonly used to hold seeds, suet and the like as food for wild animals such as birds, squirrels, etc. Many of the collapsible wild game feeders of the prior art are constructed from plastic polymer, natural fiber mesh or netting. Mesh or netting feeders have the advantage of not requiring a rod, dowel or other support for small birds, since the birds can perch on the mesh or net and feed at any exposed location on the feeder. Examples of mesh or net feeders of the prior art include the Thistle Pouch brand feeder manufactured by Havegard Farm, Inc. of Algoma, Wis., and Feather Friends E-Z Feeders brand wild bird feeder marketed by Canine's Choice of Marion, Ind. Other types of collapsible feeders are disclosed in U.S. Pat. Nos. 5,203,281; 4,706,851; and 4,026,244. Another type of collapsible wild game feeder is described in applicant's U.S. Pat. No. 5,479,881. The feeder of the '881 patent consists of a solid, weather-resistant bag fitted with openings at its base to allow attachment of rods for perching and access to the seed or other food contained in the bag.

Although many collapsible wild game feeders of the known art are convenient to install and highly attractive to wild game when they are first placed in use, none of the collapsible feeders of the known art are suitable for the feeding of squirrels or other large, aggressive feeding wildlife such as jays and monk parakeets. Squirrels and other large, aggressive feeding wildlife quickly tear the mesh of collapsible feeders of the known art and create holes through which the food spills from the feeder onto the ground below. Similarly, squirrels and large birds can easily enlarge the feeding openings or simply create new openings in the walls of the feeder of the '881 patent. After squirrels or large birds have damaged the net, webbing or walls of feeders of the known art, the food spills out and is no longer available to attract wildlife to the feeder. Further, the spilled feed creates additional problems by attracting mice and other pests that feed on the ground.

Wire mesh feeders constructed of rigid steel wire are also well known to those skilled in the art of wild game feeding. The rigid steel wire mesh feeders are frequently used to hold blocks of suet or mixtures of seed, animal fat, peanut butter and the like. Although the rigid wire mesh feeders of the known art are resistant to chewing by squirrels and pecking by aggressive feeding birds, the rigid wire mesh feeders are not selectively collapsible for storage, shipment, etc. When the rigid wire mesh feeders are bent, dented, flattened or crushed, they cannot be expanded and reused without suffering metal fatigue and damage to their attachments, connections and welds. One further disadvantage of many collapsible feeders is that they are suited for only one size of feed.

In an effort to overcome the disadvantages of the prior art collapsible feeders, applicant previously designed collapsible feeders which are disclosed in U.S. Pat. Nos. 6,047,661 and 6,073,582. In the '661 and '582 patents, the mesh openings were designed to accommodate a specific seed size. Applicant provided an improved collapsible feeder which is disclosed in U.S. Pat. No. 6,427,629 which issued on Aug. 6, 2002. Although applicant's feeder of U.S. Pat. No. 6,427,629 truly represented an improvement over the prior art, the feeder sometimes would not remain in its extended position while the feeder was being filled or hung which sometimes resulted in feed flowing from the feeder from between adjacent rings. In an effort to improve upon applicant's earlier feeders, applicant designed an improved feeder which is disclosed in U.S. Pat. No. 6,866,004. Although the feeders of U.S. Pat. Nos. 6,427,629 and 6,866,004 achieved all of their stated objectives, the solid metal material of the feeder segments thereof prevented the owner of the feeder from visually determining the amount of feed remaining in the feeder. Additionally, the weight of the all metal feeders increased the shipping costs thereof somewhat. The feeders of applicant's earlier patents truly represented a significant advance in the art and it is believed that the collapsible feeder described herein represents an improvement over applicant's earlier designs.

SUMMARY OF THE INVENTION

A collapsible feeder for birds, squirrels and the like is disclosed and includes a collapsible feeder body, having upper and lower ends, comprising a base and a rim, a series of hollow body members of graduated diameters which are extendible to form a feeder body, the segment of smallest diameter being joined to the base, the other segments being collapsible around the segment of smallest diameter inwardly of the rim. A feeder lid is positioned at the upper end of the segment of greatest diameter when the feeder body is in the extended position. A hanger is pivotally secured to the roof of the uppermost segment for supporting the feeder on a branch, hanger, etc. The segment of smallest diameter has feed outlets formed therein so that feed in the feeder body may pass outwardly through the feed outlets onto the base inwardly of the rim. The feeder body may be annular, square, rectangular, hexagonal, octagonal, or any other suitable configuration. The feeder segments are comprised of a perforated metal material so that the owner may visually determine the feed level within the feeder and which permits clinging birds to feed through the perforations. The feeder can accommodate any kind of bird feed or even a mix of different seeds. The feeder includes means for yieldably maintaining the feeder in its extended position to facilitate the filling and hanging of the feeder.

It is therefore a principal object of the invention to provide a selectively collapsible feeder for birds, squirrels and other wild game.

Yet another object of the invention is to provide a selectively collapsible feeder having feeder segments, some of which are constructed of perforated metal material.

Still another object of the invention is to provide a selectively collapsible feeder which occupies a minimum of space for shipping and storage when empty.

Still another object of the invention is to provide a selectively collapsible feeder which is suitable for the feeding of both small perching birds in addition to squirrels, jays and other more aggressive feeding wildlife species.

Yet another object of the invention is to provide a selectively collapsible feeder which includes means for yieldably maintaining the feeder in a straight extended position.

These and other objects will be obvious to those skilled in the art.

BRIEF DESCRIPTION OF THE DRAWINGS

FIG. 5 is a partial exploded perspective view of the feeder segments; and

FIG. 6 is a partial sectional view of the feeder segments.

DETAILED DESCRIPTION OF THE INVENTION

Figure 1:
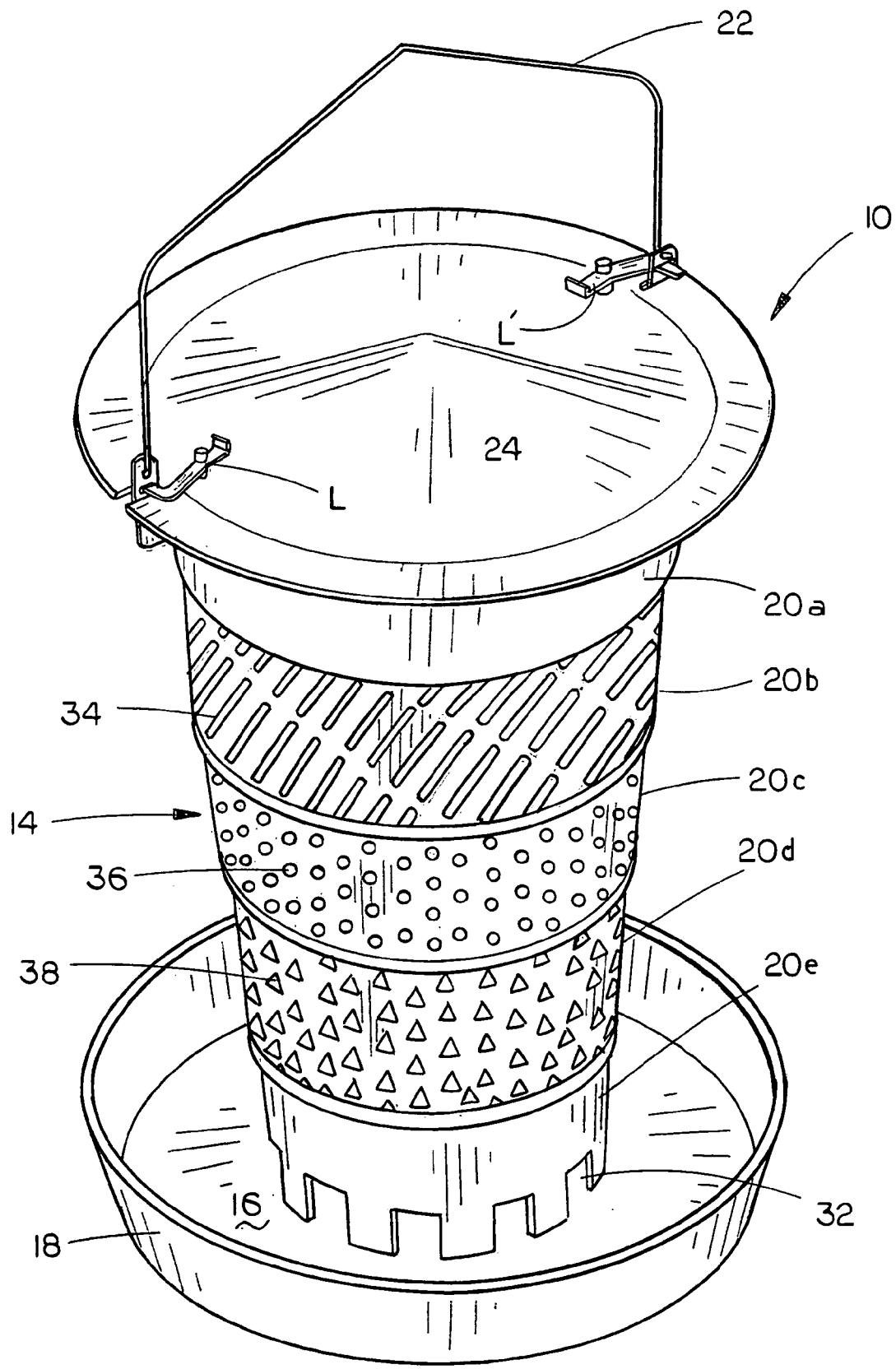
FIG. 1 is a perspective view of the feeder of this invention illustrating three different types of perforated segments which may be utilized.
Figure 2:
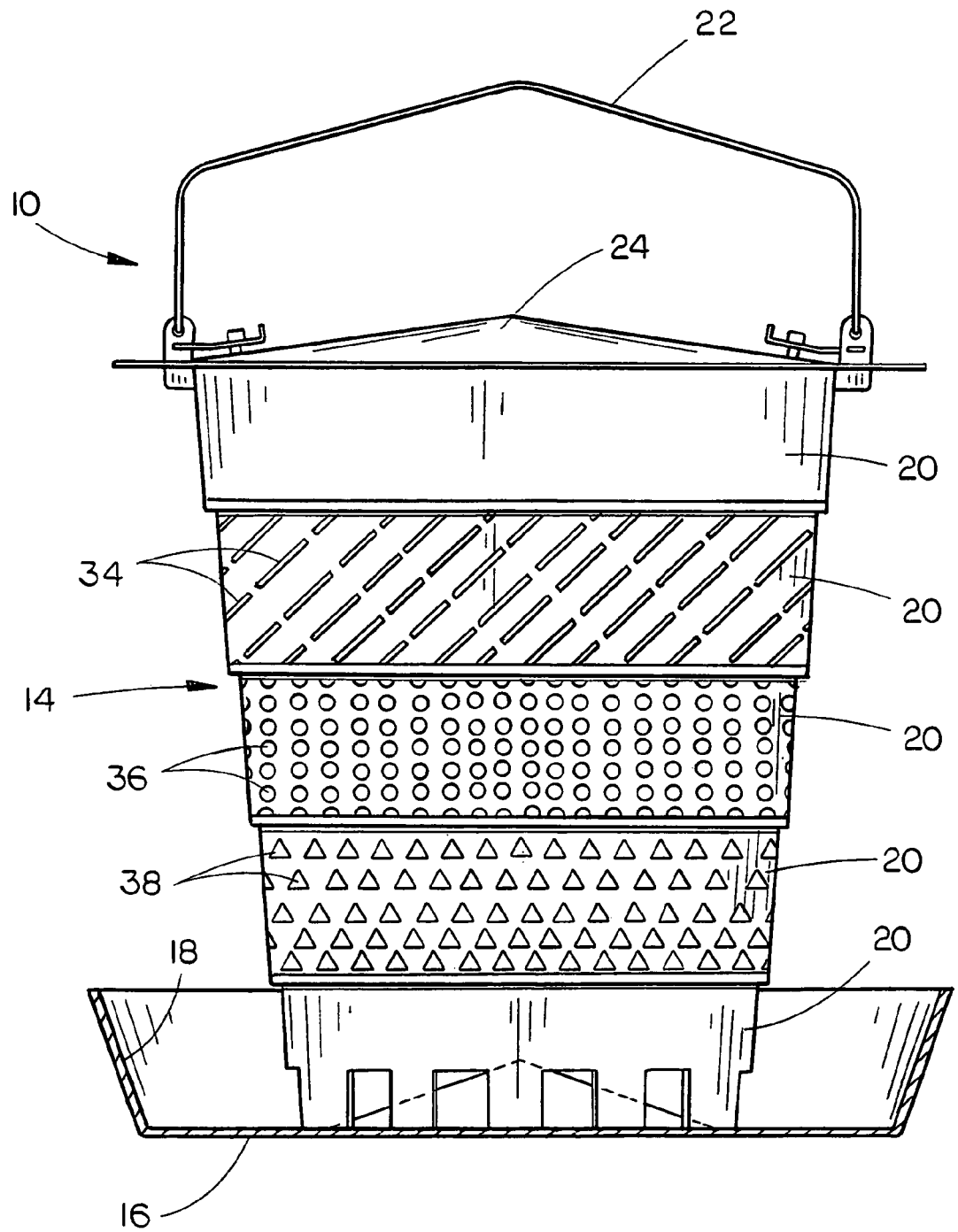
FIG. 2 is a side view of the feeder of FIG. 1 with portions cut away to more fully illustrate the invention.
Figure 3:
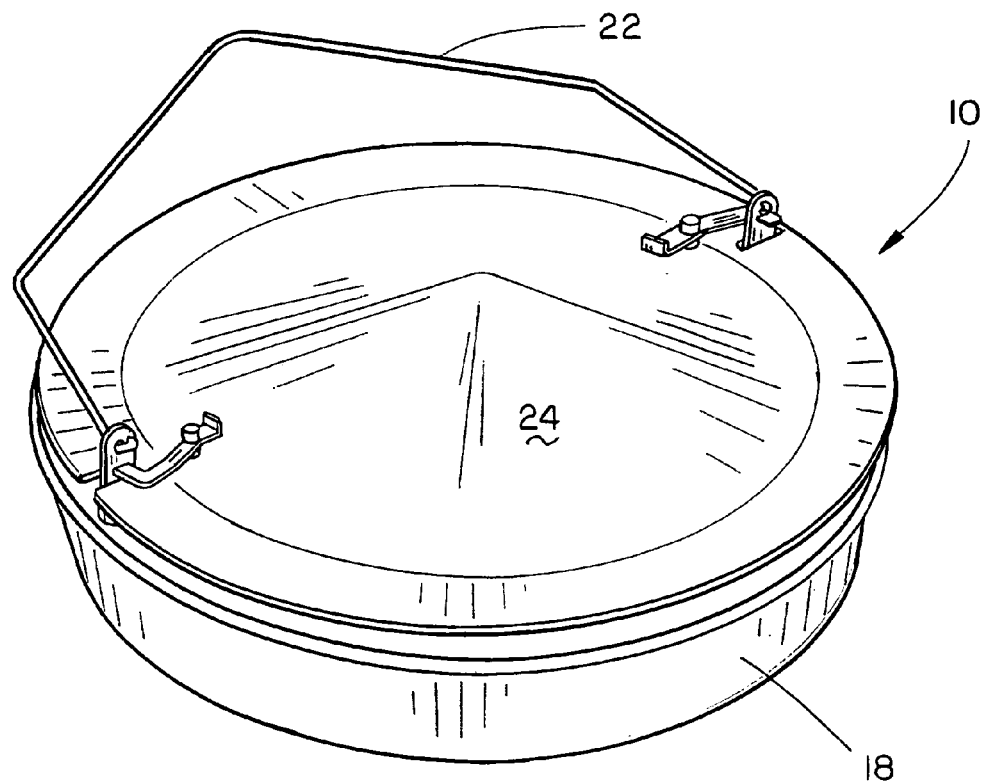
FIG. 3 is a perspective view of the feeder in a collapsed position.
Figure 4:
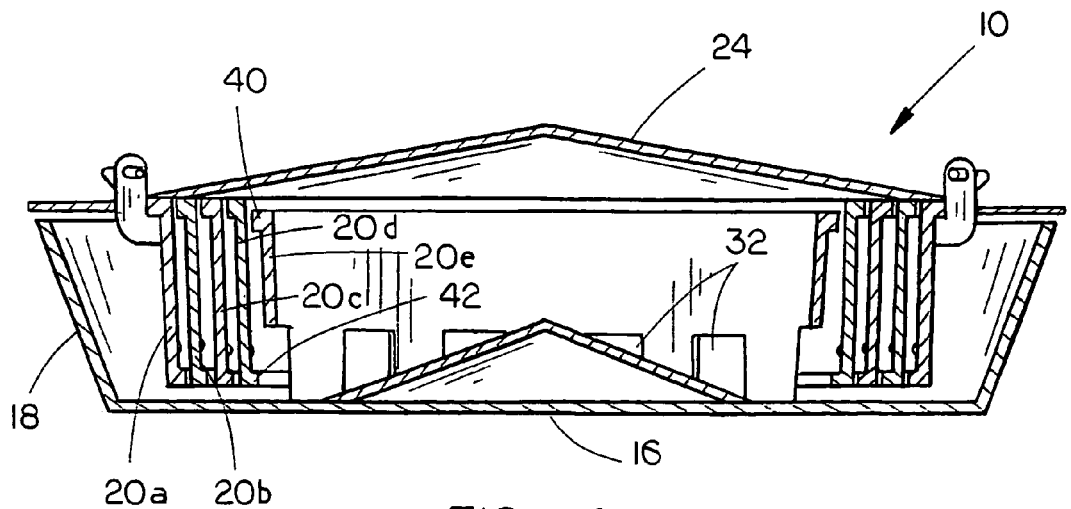
FIG. 4 is a sectional view of the feeder in a collapsed position.

The collapsible feeder of this invention is referred to generally by the reference numeral 10. Feeder 10 includes a feeder body 14 which has upper and lower ends. Feeder body 14 comprises a base 16, rim 18, and a series of hollow body segments 20a, 20b, 20c, 20d and 20e of graduated diameters which are extendible to form a feeder body. The segment of smallest diameter (segment 20e) is joined to the base 16. The other segments 20a, 20b, 20c and 20d are collapsible around the lowermost segment of smallest diameter (20e) inwardly of the rim 18, as illustrated in FIG. 4. A hanger 22 is pivotally connected to the segment of greatest diameter (the uppermost segment 20a) for supporting the feeder from a suitable support, branch, etc. The numeral 24 refers to a cone-shaped lid which selectively closes the open upper end of the feeder 10. A plurality of feed outlet openings 32 are formed in the segment of smallest diameter (the lowermost segment 20e) to enable food within the feeder body to pass outwardly therethrough inwardly of the rim 18, as seen in FIG. 1.

At least some, and preferably all, feeder segments except the upper and lower segments 20 are constructed of a perforated metal material. The drawings show three different types of perforated metal. The uppermost perforated segment is shown to have diagonal slits 34 formed therein while the middle perforated segment is shown to have round holes or perforations 36. The lower perforated segment is shown to have triangular openings 38 formed therein. Normally, all of the perforated sections would have the same type of perforations formed therein. Not only do the perforations in the feeder segments provide places for the birds to cling to and feed through the perforations, but also enable the owner of the feeder to visually determine the level of feed in the feeder.

In FIG. 4, the lowermost segment or ring 20e has a shoulder 40 which extends outwardly therefrom. The next segment or ring 20d has a lower shoulder 42 which extends inwardly therefrom, as seen in FIG. 4. The interior surfaces of segments or rings 20d, 20c, 20b and 20a have a plurality of spaced-apart raised lips or protrusions 35 extending inwardly therefrom which are positioned immediately above the shoulder 42 thereof when shoulders 40 and 42 are in abutting engagement, as seen in FIG. 6. Although the protrusions or lips are described as being spaced-apart, they could be continuous or ring-like if so desired. As seen in FIG. 1, the lid 24 extends downwardly and outwardly from the upper end of segment 20a. Lid 24 is locked in place by latches L and L'.

The collapsible feeder of this invention will normally be in the collapsed position during shipment or storage with the configuration thereof occupying very little space in the collapsed position. When it is desired to move the feeder to its extended position for feeding purposes, the hanger 22 is moved upwardly with respect to the base 16 to cause the segments 20 to move to the straight extended position to form the feeder body. The close engagement of the segments 20 with one another prevents feed from passing downwardly therebetween. When feed is placed in the interior of the feeder body, a certain amount of the feed passes outwardly through the openings 32 onto the base 16 inwardly of the rim 18. The wild animals may perch on the rim 18 to feed.

Additionally, when the feeder is in the straight extended position, the outwardly extending shoulders 40 on the upper ends of the segments will engage the inwardly extending shoulders 42 on the lower ends of the segments thereabove. The segments are yieldably maintained in their extended positions by the inwardly extending protrusions 35 which are positioned immediately above the outwardly extended shoulders 40.

Although it is preferred that the base 16 and rim 18 be circular and that the segments 20 are ring-shaped or annular, the feeder could have a square shape, a rectangular shape, a hexagonal shape, an octagonal shape, or any other shape deemed desirable. The perforations 34, 36 and/or 38 permit the owner of the feeder to visually determine the level of the feed in the feeder.

It can therefore be seen that a novel bird feeder has been provided which may be collapsed for storage or shipment, but which may be extended for use. The bird feeder of this invention is extremely durable due to the construction thereof.

Thus it can be seen that the invention accomplishes at least all of its stated objectives.

I claim:

1. A collapsible feeder for birds and small rodents, comprising:
   a collapsible feeder body, selectively movable between collapsed and extended positions, having upper and lower ends, comprising a base and a rim, a series of hollow body metal segments of graduated diameters which are extendible to form a feeder body, the segment of smallest diameter being joined to said base, the other segments being collapsible around the segment of smallest diameter inwardly of said rim;
   the segment of smallest diameter having feed outlets formed therein whereby feed in the feeder body may pass outwardly through said feed outlets onto said base inwardly of said rim;
   a hanger pivotally secured to the segment of greatest diameter;
   a lid on the segment of greatest diameter;
   a plurality of said feeder segments being comprised of a perforated metal material, the perforations of which define feed openings.

2. The collapsible feeder of claim 1 wherein each of said feeder segments includes a selective locking structure thereon; said selective locking structure yieldably maintaining said feeder body in its said extended position.

3. The collapsible feeder of claim 1 wherein said body segments are annular-shaped.

4. The collapsible feeder of claim 1 wherein said body segments are cylindrical.

5. The collapsible feeder of claim 1 wherein said body segments are hexagonal.

6. The collapsible feeder of claim 1 wherein said body segments are octagonal.

7. The collapsible feeder of claim 1 wherein said body segments are rectangular.

8. The collapsible feeder of claim 1 wherein the perforations of the perforated metal segments are diagonally extending slits.

9. The collapsible feeder of claim 1 wherein the perforations of the perforated metal segments are round.

10. The collapsible feeder of claim 1 wherein the perforations of the perforated metal segments are triangular.

* * * * *